United States Patent
Hsu

(10) Patent No.: US 6,989,619 B2
(45) Date of Patent: Jan. 24, 2006

(54) ROTOR APPARATUS FOR HIGH STRENGTH UNDIFFUSED BRUSHLESS ELECTRIC MACHINE

(75) Inventor: John S. Hsu, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 10/848,450

(22) Filed: May 18, 2004

(65) Prior Publication Data

US 2005/0001505 A1    Jan. 6, 2005

Related U.S. Application Data

(63) Continuation-in-part of application No. 10/668,586, filed on Sep. 23, 2003.

(60) Provisional application No. 60/472,544, filed on May 22, 2003.

(51) Int. Cl.
*H02K 1/27* (2006.01)

(52) U.S. Cl. .................. 310/156.56; 310/181; 310/191

(58) Field of Classification Search ..............
310/156.56–156.61, 191, 181, 190, 43, 51, 310/216, 198
See application file for complete search history.

(56) References Cited

U.S. PATENT DOCUMENTS

| | | | | |
|---|---|---|---|---|
| 3,411,027 A | * | 11/1968 | Rosenberg | .................... 310/181 |
| 5,091,668 A | * | 2/1992 | Cuenot et al. | ......... 310/156.61 |
| 5,397,975 A | | 3/1995 | Syverson | ...................... 322/46 |
| 5,886,445 A | | 3/1999 | Hsu | ............................ 710/211 |
| 5,929,579 A | | 7/1999 | Hsu | ............................ 318/439 |
| 6,057,622 A | | 5/2000 | Hsu | ............................ 310/191 |
| 6,097,124 A | * | 8/2000 | Rao et al. | ............... 310/156.26 |
| 6,573,634 B2 | | 6/2003 | Hsu | ............................ 310/266 |
| 6,703,741 B1 | * | 3/2004 | Ifrim | ...................... 310/156.19 |
| 2002/0117907 A1 | * | 8/2002 | Gay et al. | ..................... 310/44 |
| 2002/0180297 A1 | * | 12/2002 | Ifrim | ......................... 310/168 |
| 2004/0232794 A1 | * | 11/2004 | Hsu | ....................... 310/156.56 |
| 2005/0001505 A1 | * | 1/2005 | Hsu | ....................... 310/156.56 |

FOREIGN PATENT DOCUMENTS

| | | | |
|---|---|---|---|
| EP | 803 962 | * | 10/1997 |
| JP | 2000-278899 | * | 10/2000 |

* cited by examiner

*Primary Examiner*—Karl Tamai
(74) *Attorney, Agent, or Firm*—Quarles & Brady LLP

(57) ABSTRACT

A radial gap brushless electric machine (30) having a stator (31) and a rotor (32) and a main air gap (34) also has at least one stationary excitation coil (35a, 36a) separated from the rotor (32) by a secondary air gap (35e, 35f, 36e, 36f) so as to induce a secondary flux in the rotor (32) which controls a resultant flux in the main air gap (34). Permanent magnetic (PM) material (38) is disposed in spaces between the rotor pole portions (39) to inhibit the second flux from leaking from the pole portions (39) prior to reaching the main air gap (34). By selecting the direction of current in the stationary excitation coil (35a, 36a) both flux enhancement and flux weakening are provided for the main air gap (34). Improvements of a laminated rotor, an end pole structure, and an arrangement of the PM elements for providing an arrangement of the flux paths from the auxiliary field coil assemblies are also disclosed.

15 Claims, 15 Drawing Sheets

ROTOR APPARATUS FOR HIGH STRENGTH UNDIFFUSED BRUSHLESS ELECTRIC MACHINE

CROSS-REFERENCE TO RELATED APPLICATION

The benefit of priority based on U.S. Provisional Patent Application No. 60/472,544, filed May 22, 2003, is claimed herein. This is a continuation-in-part of U.S. patent application Ser. No. 10/668,586 filed Sep. 23, 2003.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

The field of the invention is brushless machines, including both AC and DC machines, including both motors and generators, and including induction machines, permanent magnet (PM) machines and switched reluctance machines.

DESCRIPTION OF THE BACKGROUND ART

There are three major types of brushless electric machines available for the electric vehicle (HV) and hybrid electric vehicle (HEV) drive systems. These are the induction machine, the PM machine, and the switched-reluctance machine.

Permanent magnet (PM) machines have been recognized for having a high power density characteristic. A PM rotor does not generate copper losses. One drawback of the PM motor for the above-mentioned application is that the variation of the air gap flux produced by the PM rotor is limited, and therefore, a sophisticated approach is required for high speed, field weakening operation. Another constraint is that inductance is low, which means that current ripple must be controlled.

It is understood by those skilled in the art that a PM electric machine has the property of high efficiency and high power density, however, the air gap flux density of a PM machine is limited by the PM material, which is normally about 0.8 Teslas and below. A PM machine cannot operate at an air gap flux density as high as desired. When the PM motor needs to have a weaker field with a reasonably good current waveform for high-speed operation, a sophisticated power electronics inverter is required.

Hsu, U.S. Pat. No. 6,573,634, issued Jun. 3, 2003, and entitled "Method and Machine for High Strength Undiffused Brushless Operation" discloses an axial gap PM machine for higher strength, undiffused operation.

In many applications, a radial gap machine is preferred. When considering a radial gap configuration for undiffused, high strength operation, several problems have to be overcome. It is desirable to provide a compact design with a shape similar to a conventional radial gap machine. It is not apparent how to arrange the PM material so as to control diffusion between poles of opposite polarity. It is also not apparent how to design the auxiliary field coils so as to complete a magnetic circuit through the rotor.

The electric machine of U.S. patent application Ser. No. 10/668,586 filed Sep. 23, 2003, simplifies the field weakening control requirements. The compactness of the motor is a very important requirement for a vehicle or other applications. In this prior application, the rotor was provided with extension and a ring structure for facing the field winding assemblies across an axial air gap. The present invention continues the ability to enhance and weaken flux in the primary air gap, while improving the construction of the rotor.

SUMMARY OF THE INVENTION

This invention provides a radial gap high strength PM machine and method for undiffused operation. The present invention provides improvements of a laminated rotor, an end pole structure, and an arrangement of the PM elements for providing an arrangement of the flux paths from the auxiliary field coil assemblies. These field coil assemblies provide an additional field flux which interacts with the PM flux along a flux path that is very different from those of other electric machines.

The invention is incorporated in motor having a stator and a rotor spaced from the stator to define a primary air gap relative to an axis of rotation for the rotor. The rotor has an axis of rotation and pairs of rotor pole portions of opposite polarity disposed at least partly around a circumference of the rotor. The rotor also has at least a first stationary excitation coil assembly for receiving direct current from an external source that is positioned across a secondary air gap so as to induce a second component of flux in the rotor which increases a resultant flux in the primary air gap when said direct current is of a first polarity and which reduces resultant flux in the primary air gap when said direct current is of a second polarity opposite said first polarity. PM material is disposed between the rotor pole portions for conveying a second component of flux to or from the primary air gap and for inhibiting the rotor-side component of flux from leaking from said pole portions prior to reaching the primary air gap.

The invention provides stationary auxiliary field windings and avoids the use of any rotating windings.

The invention is applicable to both AC and DC machines, and to both motors and generators.

The invention is specifically aimed at providing a compact electric machine structure for application or electric or hybrid vehicles.

The invention is also practiced in a method of controlling flux in a brushless electrical machine, the method comprising: inducing a first flux in a rotor from a stator across a radial air gap by conducting a current in a primary excitation winding on the stator; positioning a first excitation coil at one end of the rotor; conducting a direct current through the first excitation coil so as to produce a second flux in the rotor across at least one axial air gap and to produce a resultant flux in radial air gap resulting from the first flux and the second flux; providing portions of PM material between poles in the rotor, which is of generally cylindrical shape, so as to convey the second flux to or from the radial air gap and to prevent leakage of the second flux in the rotor before reaching the radial air gap; conducting a direct current of a first polarity through the first excitation coil, so as to increase resultant flux in the radial air gap; and conducting a direct current of a second polarity through the first excitation coil so as to weaken resultant flux in the radial air gap.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION OF THE PREFERRED EMBODIMENTS

Figure 1:
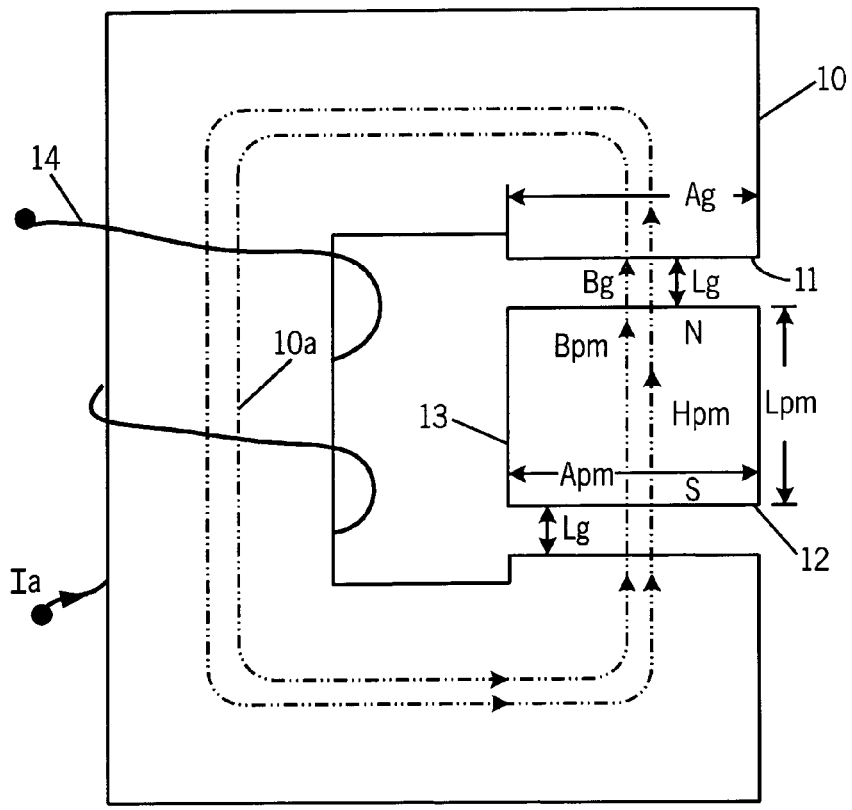
FIGS. 1–6 are graphs and schematics illustrating a theoretical basis for the current invention.

The principle of a high strength, undiffused brushless machine has been previously disclosed in the Hsu, U.S. Pat. No. 6,573,634, issued Jun. 3, 2003, and Hsu, U.S. patent application Ser. No. 10/668,586 filed Sep. 23, 2003, the disclosures of which are hereby incorporated by reference. The following theoretical description may be of benefit to an understanding of the advantages provided by the present invention. The conclusions of the following derivations show that significant field enhancement can only be achieved through an additional flux path excited through an excitation winding. A significant field enhancement is achieved through the additional d-axis current in a conventional PM (permanent magnet) machine. The derivations also show that the field weakening can be achieved without demagnetizing the PM elements. A simple PM magnetic circuit that has the PM elements connected in series with the air gaps and the return magnetic core is shown in FIG. 1. This circuit represents a conventional PM motor that has a pair of air gaps 11, 12 between the PM 13 and the stator core 10, and the armature winding 14 with current, Ia. A positive current direction shown in FIG. 1 produces a positive field in the direction shown for the B and H. The nomenclature, B, is for flux density, H for magnetic field strength, L for length, A for area, and I for current. The suffix g represents the air gap, pm for PM, and a for armature. For example: Bg represents the air gap flux density.

Electromagnetic circuit theory is based on fundamental laws including Ampere's law, which can be stated in words as follows: "The line integral of the magnetic field strength or intensity taken around any closed path is proportional to the total current flowing across any area bounded by that path." In symbols, the first law is $$\oint H \cdot dL = \sum I \tag{1}$$

Applying expression (1) to the simple series magnetic circuit shown in FIG. 1 results in the following $$H_{pm} \cdot L_{pm} + 2 \cdot \frac{B_g}{\mu_0} \cdot L_g = \sum I_a \tag{2}$$

where $\mu_0$ is the permeability in air, and $$\sum I_a$$

is the product of the number of turns and the current, $I_a$. The right-hand rule is used to determine the sign of the field produced by $$\sum I_a.$$

In expression (2) it is assumed that magnetic saturation of the core 10 is negligible. The flux 10a in the circuit of FIG. 1 is a continuous loop. Ignoring any leakage flux and assuming the PM area Apm is the same as the air gap area, Ag, the following equality of flux densities applies:

$$B_g = B_{pm} \tag{3}$$

Substituting expression (3) into exp. (2) gives $$B_g = B_{pm} = \left( \frac{\sum I_a}{L_{pm}} - H_{pm} \right) \cdot \left( \frac{L_{pm}}{2 \cdot L_g} \right) \cdot \mu_0 \tag{4}$$

The intrinsic flux density is the contribution of the magnetic material to the total magnetic flux density (B). It is the vector difference between the total magnetic flux density in the material and the magnetic flux density that would exist in a vacuum under the same field strength (H). This relation is expressed by subtracting the magnetic flux density produced by H in a vacuum from the value of B.

Substituting expression (4) into the definition of intrinsic flux density gives $$B_{pm} - H_{pm} \cdot \mu_0 = \left( \frac{\sum I_a}{L_{pm} + 2 \cdot L_g} - H_{pm} \right) \cdot \left( \frac{L_{pm}}{2 \cdot L_g} + 1 \right) \cdot \mu_0 \tag{5}$$

Figure 2:
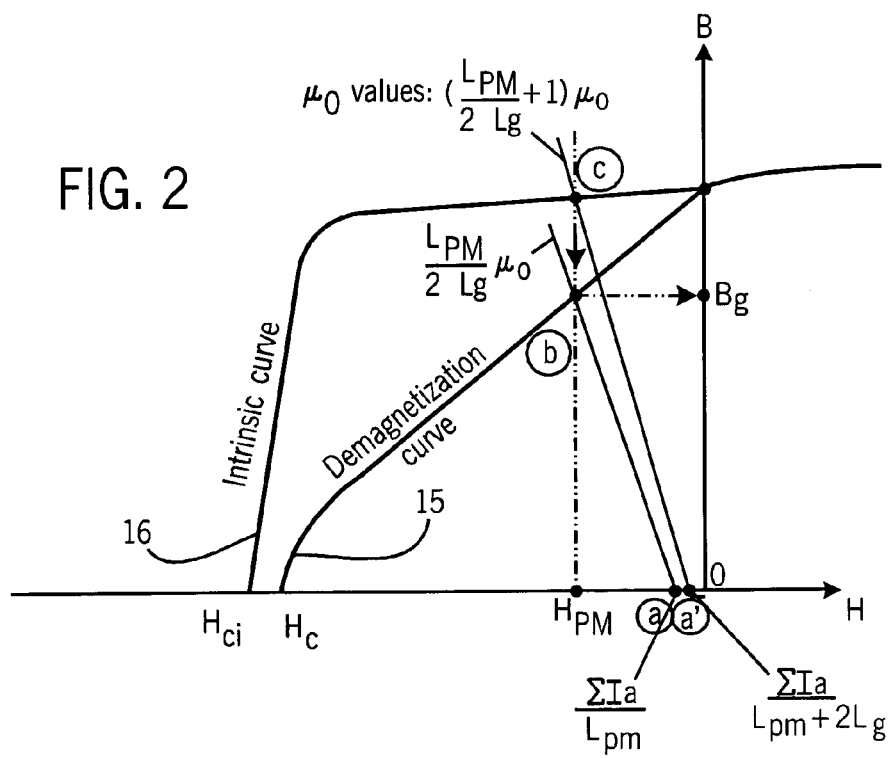

FIG. 2 shows the familiar graphical approaches for obtaining the air gap flux density, $B_g$, through either the actual demagnetization B/H curve 15 or the intrinsic induction B/H curve 16. The slopes, $$\left(\frac{L_{pm}}{2 \cdot L_g}\right) \cdot \mu_0 \text{ and } \left(\frac{L_{pm}}{2 \cdot L_g} + 1\right) \cdot \mu_0,$$

of the permeance coefficient lines 17 used for intersecting the B/H curves are different in both cases as indicated in (4) and (5). Either approach gives the same air gap flux density, $B_g$. FIG. 2 also includes a small demagnetization (i.e., $I_a$ is negative) current from the armature reaction. The starting points a and a' for the methods using the actual demagnetization B/H curve and using the intrinsic induction B/H curve, respectively, are very close to each other. One is located at $$\frac{\sum I_a}{L_{pm}},$$

and the other one at $$\frac{\sum I_a}{L_{pm} + 2 \cdot L_g}.$$

The demagnetization caused by the value of the negative $$\sum I_a$$

divided by the PM thickness, $L_{pm}$, or by ($L_{pm}+2 \cdot L_g$) suggests that a thicker PM can prevent permanent damage to the PM from the demagnetizing armature reaction.

Figure 3:
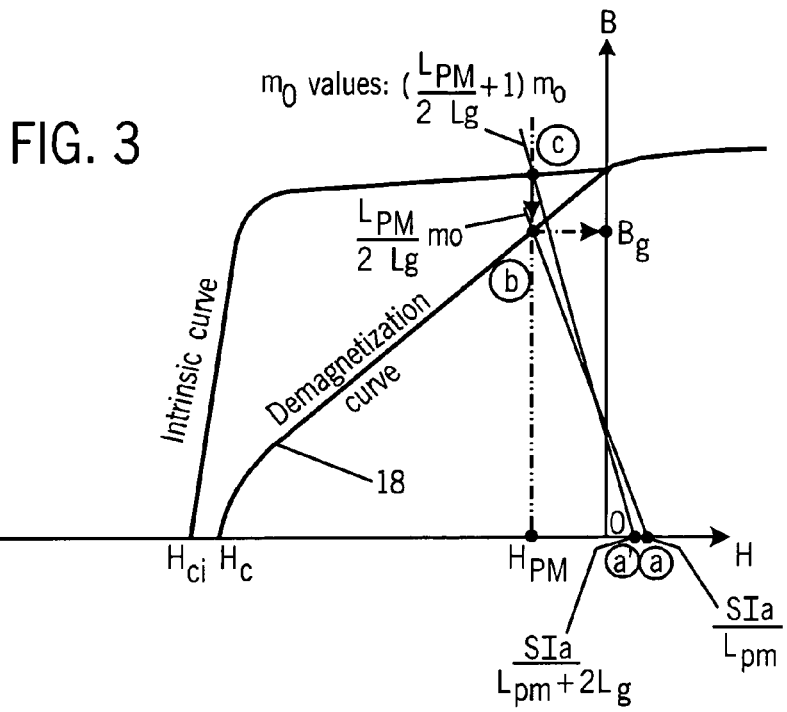

FIG. 3 shows that when the armature current $I_a$ is a positive value, point a or a' is in the positive direction of the horizontal coordinate. This causes the air gap flux density, $B_g$, to rise. However, the field enhancement is limited by the saturation of the PM B/H curve 18, because the air gap flux density can never be higher than the PM flux density.

Figure 4:
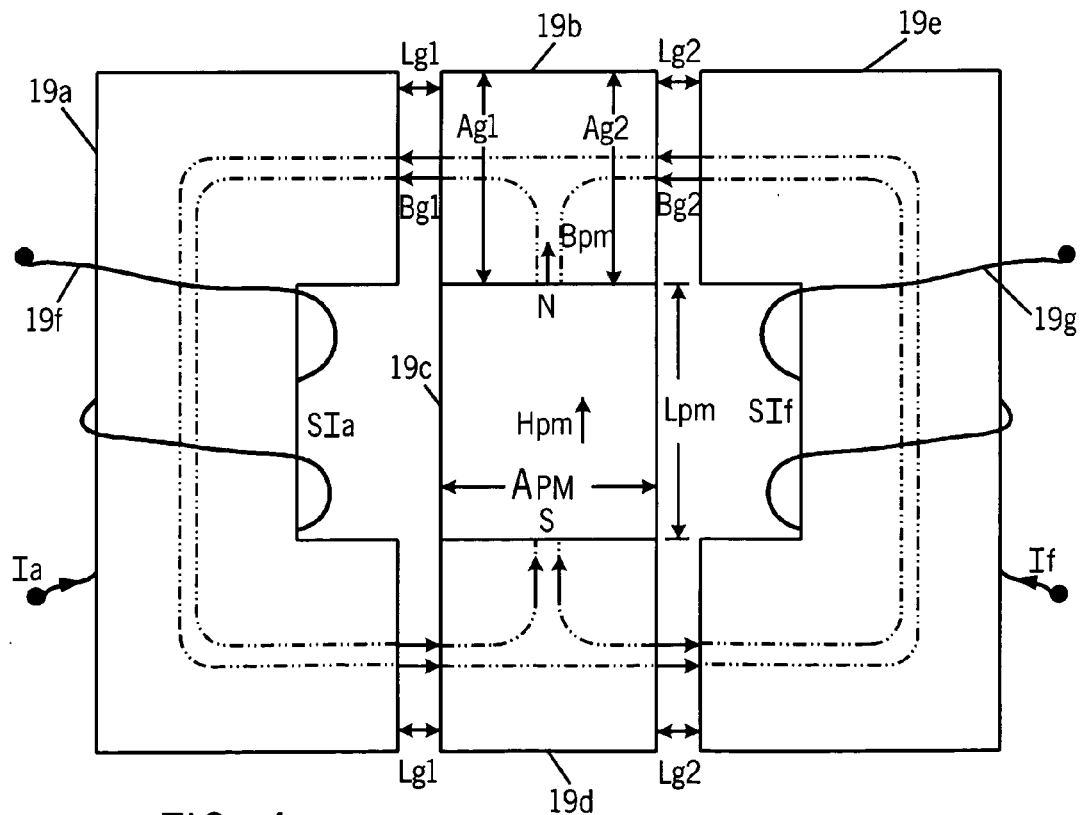

FIG. 4 shows the magnetic paths for a system excited by both PM and field current, $$\sum I_f,$$

with the armature reaction, $$\sum I_a,$$

taken into consideration. For simplicity the components 19a, 19b, 19c, 19d and 19e of the magnetic circuit shown in FIG. 4 are of a uniform cross sectional area and thickness. The upper and lower dimensions are symmetrical. The left side gaps are defined as the main air gaps, $L_{g1}$, and the right side gaps are defined as the excitation gaps, $L_{g2}$. The same nomenclature mentioned earlier applies to this analysis.

An examination of the center upper core 19b reveals that, due to the fact that the magnetic flux must be continuous, the total flux going into the core is zero.

$$B_{g1} \cdot A_{g1} = B_{g2} \cdot A_{g2} + B_{pm} \cdot A_{pm} \quad (6)$$

where the symbol B represents flux density, A is for area, and g is the air gap. The suffix g1 is for the left side main air gap, g2, the right side excitation air gap, and pm, the PM.

For the magnetic path that goes through the gaps the equation, according to Ampere's law (1) is $$\sum I_f + \sum I_a = 2 \cdot \frac{B_{g2}}{\mu_0} \cdot L_{g2} + 2 \cdot \frac{B_{g1}}{\mu_0} \cdot L_{g1}, \quad (7)$$

where the air-gap permeability, $\mu_o$, is used to relate $B_{g1}$ and $B_{g2}$ to $H_{g1}$ and $H_{g2}$, respectively.

For the right half of the magnetic circuit in FIG. 4, the following expression applies:

$$\sum I_f = 2 \cdot \frac{B_{g2}}{\mu_0} \cdot L_{g2} - H_{pm} \cdot L_{pm} \quad (8)$$

For the left half of the magnetic circuit in FIG. 4, the following expression applies:

$$\sum I_a = 2 \cdot \frac{B_{g1}}{\mu_0} \cdot L_{g1} + H_{pm} \cdot L_{pm} \quad (9)$$

Combining equations (6) through (9) yields $$2 \cdot \sum I_f + \sum I_a = -H_{pm} \cdot L_{pm} + 4 \cdot \frac{B_{g2}}{\mu_0} \cdot L_{g2} + 2 \cdot \frac{B_{g1}}{\mu_0} \cdot L_{g1} \quad (10)$$

Substituting $B_{g2}$ from (6) to (10) yields $$2 \cdot \sum I_f + \sum I_a = \quad (11)$$
$$-H_{pm} \cdot L_{pm} - 4 \cdot \frac{L_{g2}}{\mu_0} \cdot \frac{A_{pm}}{A_{g2}} \cdot B_{pm} + \left(4 \cdot \frac{L_{g2}}{\mu_0} \cdot \frac{A_{g1}}{A_{g2}} + 2 \cdot \frac{L_{g1}}{\mu_0}\right) \cdot B_{g1}$$

Substituting $B_{g1}$ from (9) to (11)

$$B_{PM} + \frac{A_{g1} \cdot L_{pm} \cdot \mu_0}{A_{pm} \cdot 2 \cdot L_{g1}} \cdot H_{pm} = \quad (12)$$
$$\frac{A_{g2} \cdot L_{pm} \cdot \mu_0}{A_{pm} \cdot 2 \cdot L_{g2}} \cdot \left(\frac{-\sum I_f + \frac{A_{g1} \cdot L_{g2}}{A_{g2} \cdot L_{g1}} \sum I_a}{L_{pm}} - H_{pm}\right)$$

The relationship between the main air gap flux density, $B_{g1}$, and the PM field strength, $H_{PM}$, can be derived from (9) as $$B_{gl} = \left(\frac{\sum I_a}{L_{pm}} - H_{pm}\right) \cdot \left(\frac{L_{pm}}{2 \cdot L_{gl}} \cdot \mu_0\right) \quad (13)$$

Figure 5:
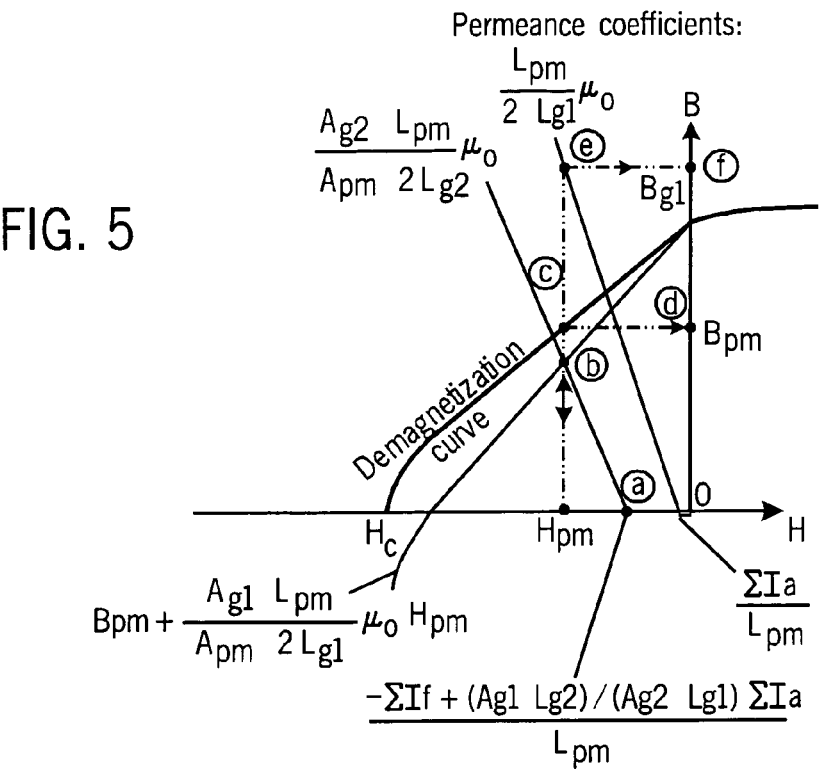

FIG. 5 shows the graphical solution of the problem with the main air gap flux density of the magnetic paths with the PM material and both the main and excitation air gaps $L_{g_1}$, $L_{g_2}$. The operating point of the PM material is plotted in FIG. 5. FIG. 5 can also be used to ensure that the PM material is not going to be demagnetized. The main air gap flux density, $B_{g1}$, can be subsequently obtained. The explanation of the graphical solution follows.

The PM material demagnetization curve that shows the relationship between the PM flux density, $B_{pm}$, and its field strength, $H_{pm}$, can be obtained from the PM material manufacturer. The solution curve shown in FIG. 5 represents equation (12) for the system excited by the PM material and field current with the armature reaction taken into consideration. The left-hand portion of (12), $$B_{pm} + \frac{A_{gl} \cdot L_{pm} \cdot \mu_0}{A_{pm} \cdot 2 \cdot L_{gl}} \cdot H_{pm},$$

is plotted in the same coordinates as the demagnetization curve of the selected PM material. Since $H_{pm}$ is a negative value in the second quadrant, this left-hand portion of (12) is a curve below the $B_{pm}$ curve. Its drop below the $B_{pm}$ curve depends on the ratio of $$\frac{A_{gl} \cdot L_{pm} \cdot \mu_0}{A_{pm} \cdot 2 \cdot L_{gl}}.$$

The steps for obtaining enhanced flux densities in the main air gap $L_{g1}$ are detailed in FIG. 5. First, point a, highlighted in a circle, is located by the field current and armature reaction, $$\frac{-\sum I_f + \frac{A_{g1} \cdot L_{g2}}{A_{g2} \cdot L_{g1}} \sum I_a}{L_{pm}},$$

calculated in a magnetic field intensity (H) unit such as Oersted. Because the field current $I_f$ is a positive current in the direction shown in FIG. 4, $I_a$ is normally a negative value from the armature reaction, and the $H_{PM}$ situated in the second quadrant is a negative value, the sum $$\left(\frac{-\sum I_f + \frac{A_{g1} \cdot L_{g2}}{A_{g2} \cdot L_{g1}} \sum I_a}{L_{pm}} - H_{pm}\right)$$

shown in the right side of expression (12) has a smaller magnitude than that of $H_{pm}$. A permeance coefficient line is drawn from point "a" and intercepts the curve that represents the left portion of expression (12). A vertical line is then drawn from point "b" and intercepts the horizontal coordinate at point "c" for the $H_{pm}$ value. This $H_{pm}$ value is the graphical solution of expression (12) at point "b". The vertical line from points "b" can be further extended upward to intercept the demagnetization curve for the flux density, $B_{PM}$, in the PM and to intercept the permeance coefficient line defined by expression (13) for the main air gap flux density, $B_{g1}$. Unlike the conventional PM machine, the value of $B_{g1}$ is not limited by the PM flux density. It can be higher than the PM flux density. In practice, the degree of enhancement is limited by the core material saturation level which is normally higher than the PM's, and by the value of $$\frac{-\sum I_f + \frac{A_{g1} \cdot L_{g2}}{A_{g2} \cdot L_{g1}} \sum I_a}{L_{pm}}$$

not reaching the demagnetization level. When using a thicker PM material the permanent demagnetization of the PM material should not be a concern. Another property of this magnetic circuit is that since the flux in the PM material opposes the field excitation during field enhancement, the leakage flux of the excitation coil through the PM elements is blocked.

When the demagnetization curves are plotted with Gauss and Oersted as the units for the vertical and horizontal coordinates, respectively, the $u_0$ can be omitted, as $u_0$ equals Gauss/Oersted.

The derivations for both the conventional series PM magnetic circuit and the additional magnetic circuit controlled by a stationary field-winding current in the present invention have been presented above for comparison. The field enhancement of a conventional PM machine is limited by the saturation of the PM B/H curve, because the air gap flux density can never be higher than the PM flux density. It is disclosed herein that a thicker PM element can prevent a permanently demagnetized PM element during field weakening as compared to a conventional PM machine. It is also disclosed herein that controlling the current of the excitation coil of the magnetic circuit can significantly weaken and enhance the main air gap flux. It is further disclosed herein that a thicker PM element can prevent a permanently demagnetized PM during field enhancement of the magnetic circuit. In the present invention, the leakage flux of the excitation coil through the PM elements of the magnetic circuit is blocked during field enhancement. No inverter current component is need for the field weakening of the magnetic circuit. Field weakening of the magnetic circuit never poses a demagnetization concern. Field enhancement can be significant with the magnetic circuit. It is limited only by the saturation of the soft magnetic core material and not by the PM.

Figure 6:
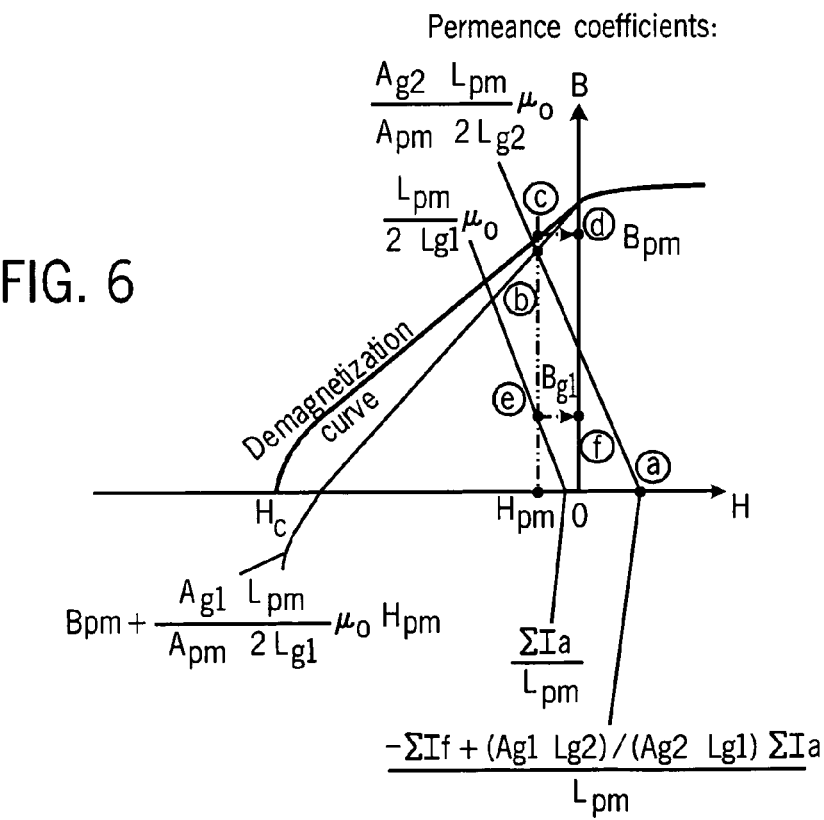

FIG. 6 shows the graphical solution for the field weakening case in the main air gap $L_{g1}$. By reversing the direction of a sufficiently high field current, $I_f$, point a moves to the right. The air gap flux density, $B_{g1}$, and the PM flux density, $B_{pm}$, can be obtained. The PM would never be demagnetized under the field weakening situation for this magnetic circuit. The air gap flux density, $B_{g1}$, is significantly reduced, as the PM flux is diverted through $L_{g2}$.

Figure 7A:
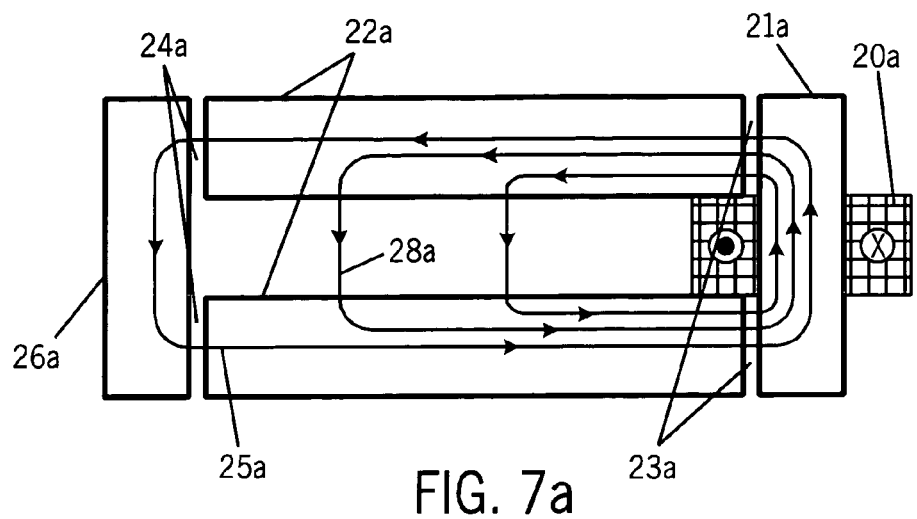
FIGS. 7a–7c are schematic diagrams of a simplified stator and rotor apparatus showing three modes of operation: a) diffused flux, b) enhanced air main gap flux with the addition of PM material and c) reversed excitation for field weakening operation.
Figure 7B:
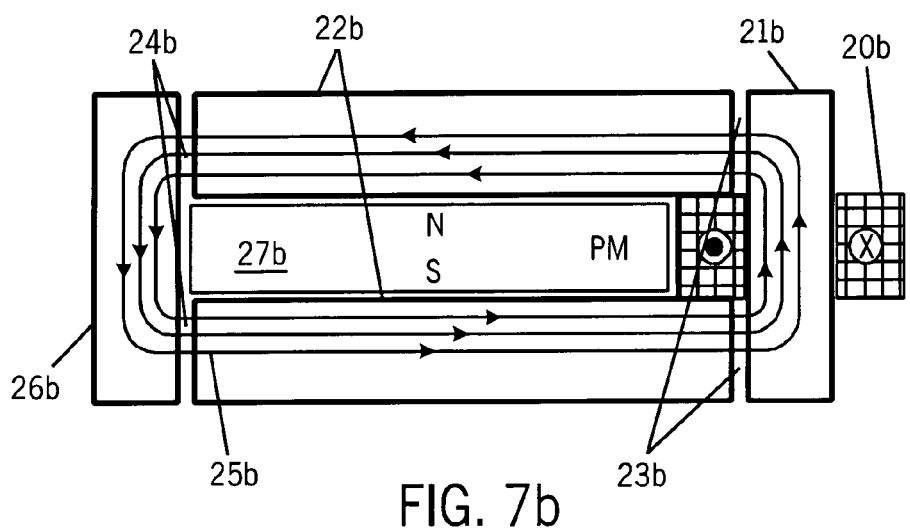
Figure 7C:
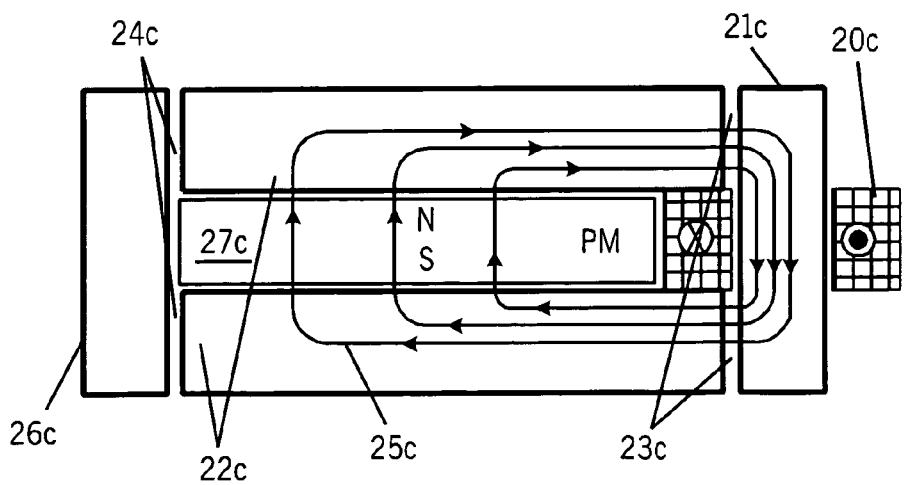

FIG. 7a–7c illustrate a simplified stator and rotor apparatus showing three modes of operation for a motor according to the present invention: a) diffused flux, b) enhancement of main air gap flux with the addition of PM material and c) reversed excitation for reducing flux in the air gap in a field weakening operation. It should be noted that only a portion of the desired PM material has been represented in FIGS. 7b and 7c, with it being understood that additional material can be added according to the following description.

The main air gap flux density of a PM machine can be increased or weakened with an additional excitation coil 20a–20c, as seen in FIGS. 7a–7c. These diagrams also illustrate how PM material will inhibit flux diffusion.

FIG. 7a shows the flux components 25a traveling through the iron core 22a of the rotor, the iron core of the stator 26a, the main air gap 24a on the left-hand side, and the excitation coil 20a supported on an additional stator iron core 21a providing a secondary air gap 23a on the right hand side of the rotor 22a. When the current flows in the excitation coil 20a, magnetic fluxes are produced in the iron cores 21a, 22a, 26a. The main air gap flux 25a is not the total flux produced by the coil 20a. A significant portion of the flux is shown as the diffused flux 28a which passes between pole portions 22a of the rotor core.

FIG. 7b shows that in order to enhance the main air gap flux 25b, PM material 27b with an N-S polarity as shown, is placed between the upper and lower pole pieces 22b of the rotor. The PM material 22b in the rotor produces flux in the main air gap 24b and also inhibits magnetic flux diffusion between the poles 22b. Thus, it enhances the usable main air gap flux density.

FIG. 7c shows that by reversing the direction or polarity of the current in the excitation coil 20c, the main air gap flux is weakened by removing the component provided by coil 20c. This provides a field weakening feature in the main air gap 24c of the machine of the present invention.

For a conventional PM machine the air-gap flux density is about 0.6 to 0.8 Teslas and cannot be weakened without the aid of some sophisticated power electronics. Both the stationary excitation coil and the PM material in the rotor maximize rotor flux in the PM machine of the present invention. It can produce two to three times the air gap flux density of a conventional PM machine. Because the torque produced by an electric machine is directly proportional to the air gap flux density, a higher torque, more powerful machine is provided with only small additions to size and weight.

Figure 8:
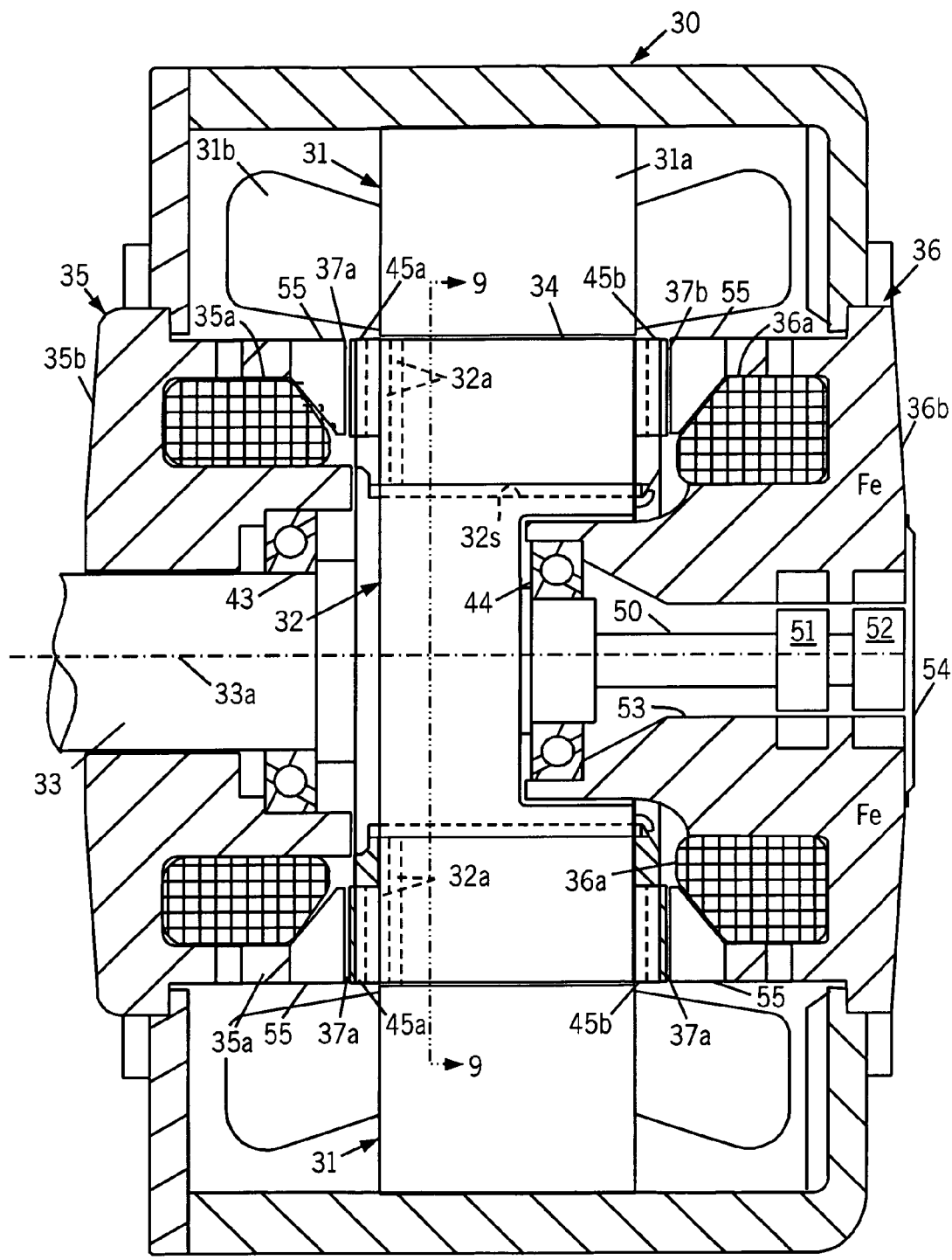
FIG. 8 is a longitudinal section view of a machine of the present invention incorporating the operating principles illustrated in FIGS. 1–7.

FIG. 8 shows a longitudinal section view of a radial gap, high strength undiffused machine 30 having DC excitation assemblies 35 and 36 at opposite ends of a rotor assembly 32. The rotor assembly 32 rotates with a main drive shaft 33 around an axis of rotation 33a. A stator 31 is disposed around the rotor 32 and has a laminated core 31a and windings 31b as seen in a conventional AC machine. The rotor assembly 32 is separated from the stator 31 by a radial air gap 34, which is also referred to herein as the primary air gap. The rotor assembly 32 is separated from the DC excitation assemblies 35 and 36 by axial air gaps 37a and 37b, respectively. Flux collectors 55 are disposed between the axial air gaps 37a, 37b and the DC excitation assemblies 35 and 36 to smooth the DC flux component and reduce the possible occurrence of eddy currents.

The rotor 32 of this end excitation, radial gap, machine 30 is mounted on drive shaft 33 which is supported by bearings 43 and 44. The cores 35b, 36b for the excitation assemblies form brackets for bearings 43, 44. The bearing brackets are used to conduct DC magnetic flux in this embodiment for the purpose of compactness. If needed, the ceramic bearings or insulated bearings (i.e., an electrically insulating material is used to isolate the rotor outer ring to the bearing housing) can be used. A short internal shaft 50 is also coupled to the rotor 32. A shaft encoder 51 and an optional pump for lubricant for the motor 52 are situated inside a passageway 53 through the core 36b. A housing cover 54 closes the passageway 53.

As seen in FIG. 8, the DC excitation assemblies 35, 36 each include a stationary, ring-shaped excitation core 35b, 36b and a multi-coil winding 35a, 36a for receiving direct current from an external source. This current can be of a first polarity illustrated in FIG. 7b, or of a second polarity as illustrated in FIG. 7c. The rings 35b, 36b encircle the rotor shaft 33. A stationary toroidal excitation coil 35a, 35b fits in an annular recess in each excitation core 35b, 36b. The cores 35b, 36b are mounted to a machine housing 45 as seen in FIG. 8.

The excitation cores 35b, 36b (FIG. 8) can be made from different types of material, such as solid steel, or thin pieces of steel. These cores 35b, 36b will not be subjected to torque, so many types of suitable bonding materials may be utilized to bond the thin pieces of steel. Another variation involves forming the cores 35b, 36b from a compressed powder having ferromagnetic properties. This aids in reducing losses in the core 35b, 36b.

Figure 9:
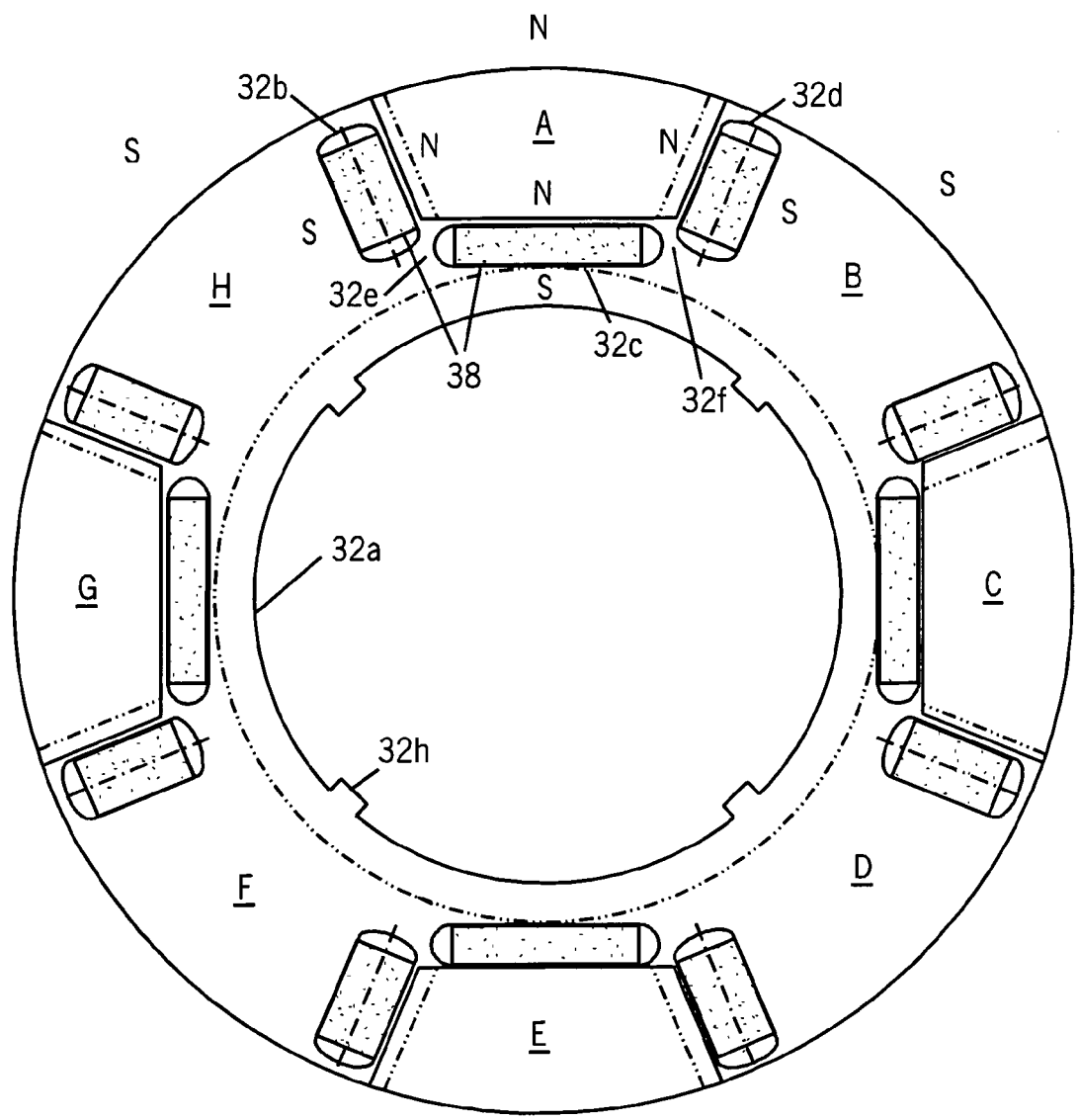
FIG. 9 is transverse sectional view taken in a plane indicated by line 9—9 in FIG. 8.
Figure 13:
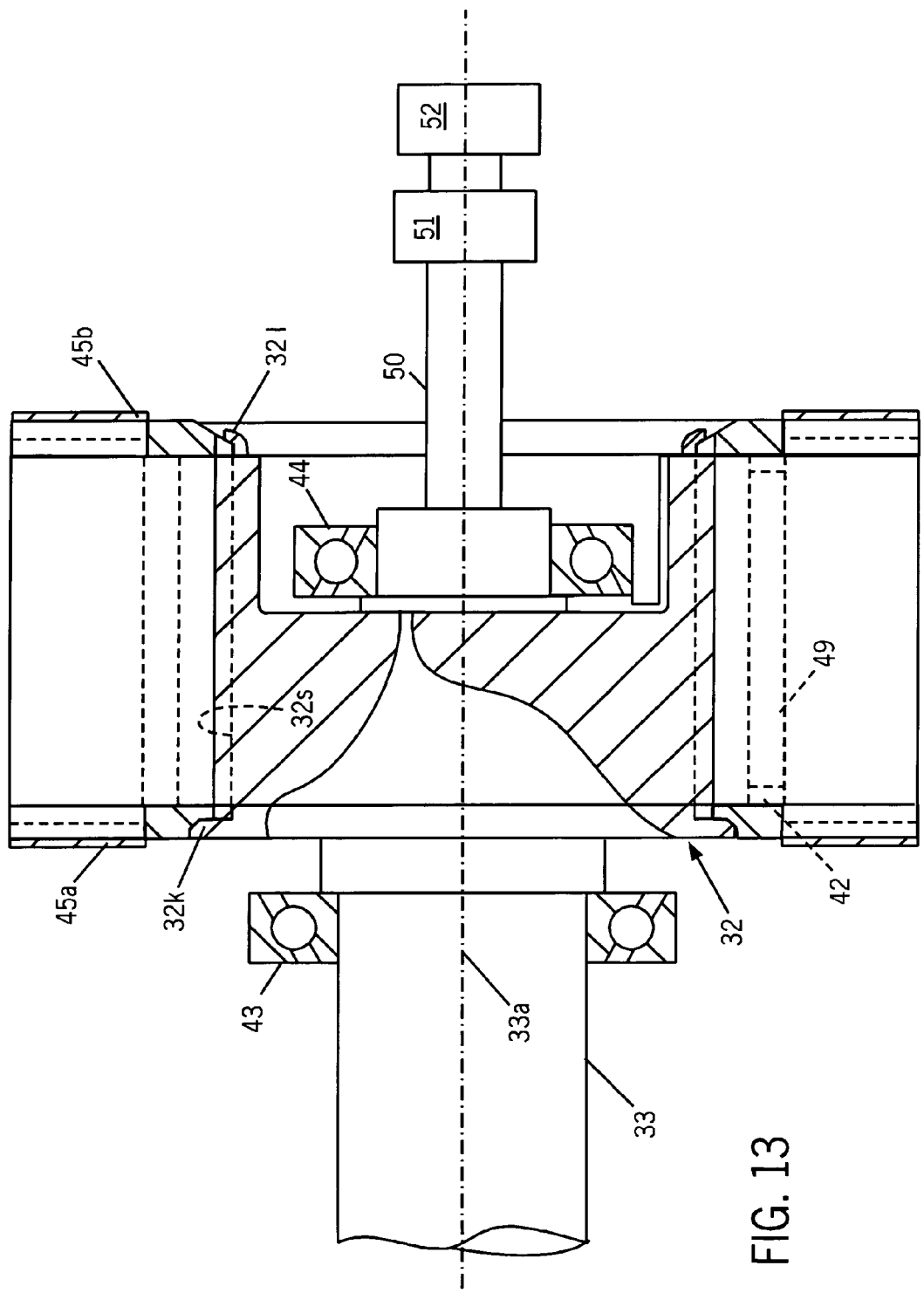
FIG. 13 is a detail sectional view of a rotor portion of the machine of FIG. 8.

As seen in FIGS. 8 and 13, the rotor assembly 32 is preferably made by stacking and laminating together a plurality of thin metal rings 32a which are punchings from a sheet material. A plan view of an individual ring piece 32a for an 8-pole motor is shown in FIG. 9.

The punchings are provided with four pairs of radial openings 32b–32c, each associated with a chordal opening 32d to provide four sets of three openings 32b–32d. When the punchings are stacked together, these openings form elongated grooves. PM elements 38 are places in grooves to bound and define four north (N) poles. The spaces between each set of three openings 32b–32d become four south (S) poles for a total of eight poles, identified as poles A–H in FIG. 9. The thickness of the PM elements 38 can be different but the PM arrangement must be mechanically symmetrical for the balance of centrifugal force. The eight poles, A–H, are defined both with respect to the radial air gap 34 and with respect the axial air gaps 37. As viewed from the axial ends, the regions between the ends of the grooves are narrow linking regions 32e, 32f, 32i, 32j which hold the PM elements 38 in position mechanically. These linking regions 32e, 32f, 32i, 32j should be preferably be magnetically saturated for reducing the leakage flux and mechanically strong enough for holding the permanent magnets (PM's) and the pole sections on the punching while the rotor 32 is rotating. The punchings 32a also have keyed projections 32h for fitting in channels 32s in the hub of the hub of the rotor 32.

Figure 11A:
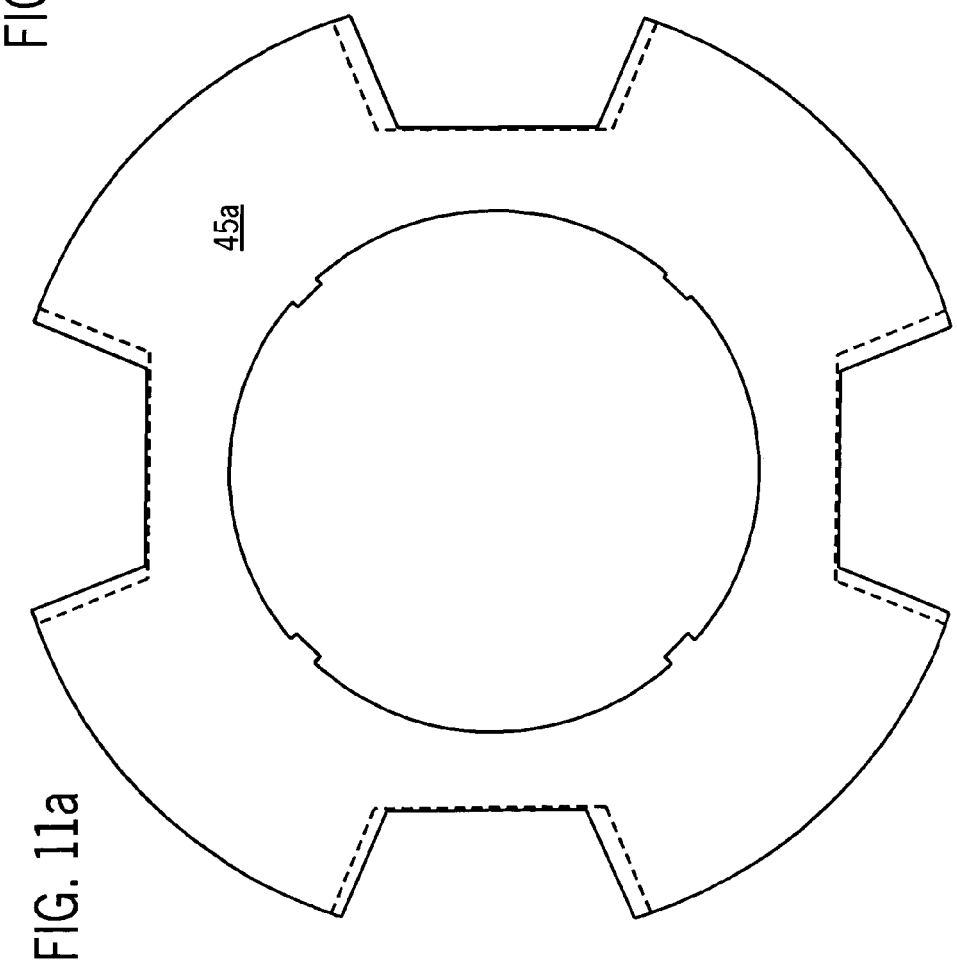
FIGS. 11a–11c are some detail views of end pieces for the rotor of the machine of FIG. 8
Figure 11B:
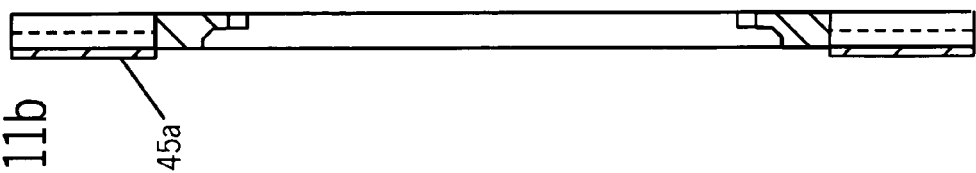
Figure 11C:
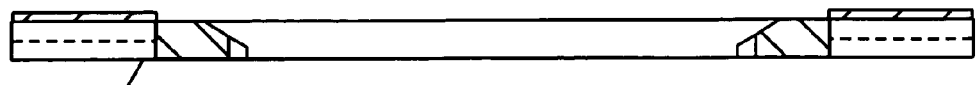
Figure 12:
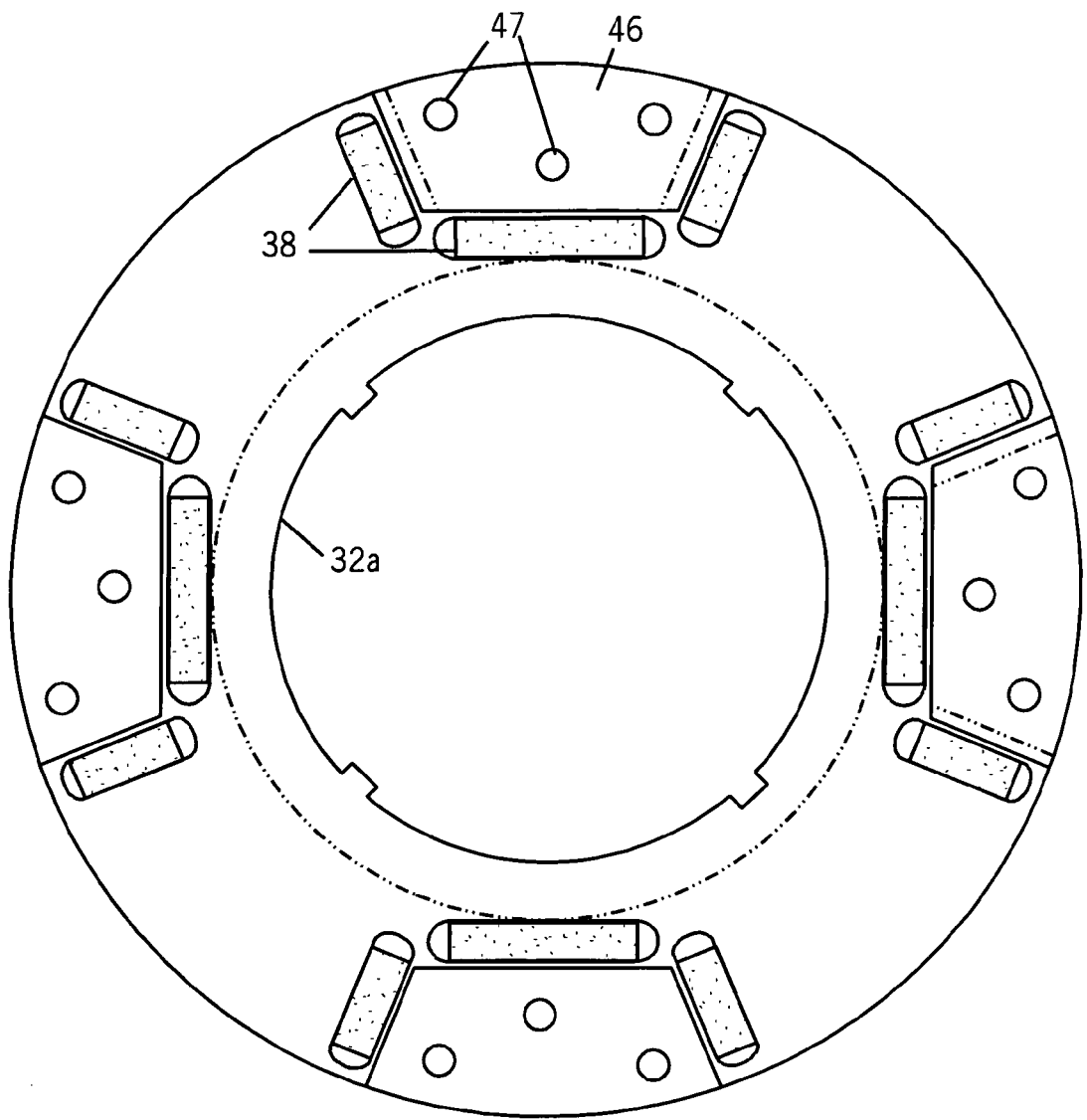
FIG. 12 is an alternative to the construction in FIGS. 11a–11c taken in the same view as FIG. 9.

At the ends of the stack of rotor laminations 32a, the assembly is held together by non-magnetic clamping pieces 45a, 45b as seen in FIG. 8. These also have keyed projections 45c (FIG. 11) for fitting in the channels 32s in the rotor hub so that the clamping pieces are locked for rotation with the rotor hub. Non-magnetic stainless steel, brass, or other non-magnetic materials can be used.

The clamping pieces 45a, 45b (FIGS. 11b, 11c) can be made slightly different for the assembly to the two ends of rotor 32 as shown in FIG. 8. At the end seen on the left in FIG. 13, the clamping piece 45 is first slipped over the hub of the rotor 32 and moved to the opposite end where is retained by an annular flange. The laminations 32a are then stacked on the hub. Finally, at the right end, the second clamping member 45b is placed on the stack and retained by a lip 32l that curls around an inside edge of the clamping member 45b. At the end seen on the right an extension curls around to form a lip to hold the clamping piece against the laminations. A high stacking factor means less space between the laminations is essential for the good performance of the machine in this embodiment. The stacked laminations 32a reduce the occurrence of eddy currents resulting from the tooth harmonics of the radial-gap flux. The DC flux which travels through in an axial direction to or from the DC excitation assemblies requires less excitation current with a higher stacking factor of the rotor core. The non-magnetic clamping pieces 45a, 45b hold the pole pieces 42 in place and close the entry to the grooves holding the PM elements 38. The PMs can be the preformed pieces or the injected type. Between pieces of PM material 38, an epoxy material can be used to fill gaps. Pressure on the pole pieces 42 can be transferred through a step (shown by dotted lines in FIG. 10) machined on both the side pole 42 and the clamping piece 45a, 45b or through other approaches such as welding the individual pieces of the end-piece assembly together.

Figure 10A:
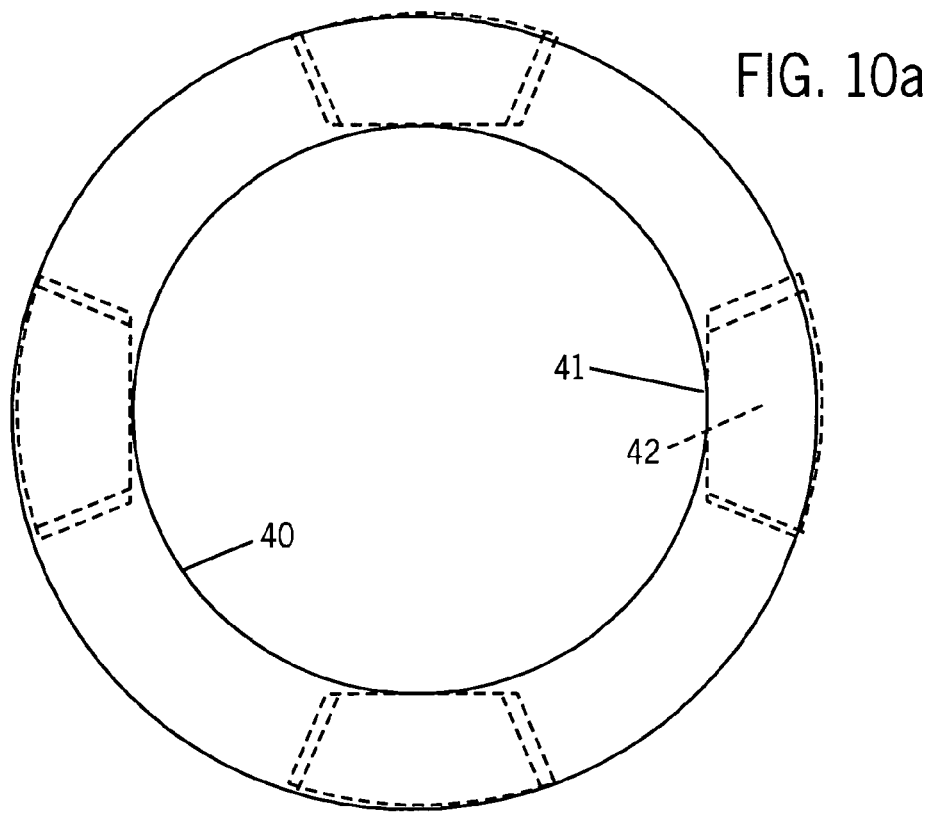
FIGS. 10a–10b are some functional detail views of parts for the rotor of the machine of FIG. 8.
Figure 10B:
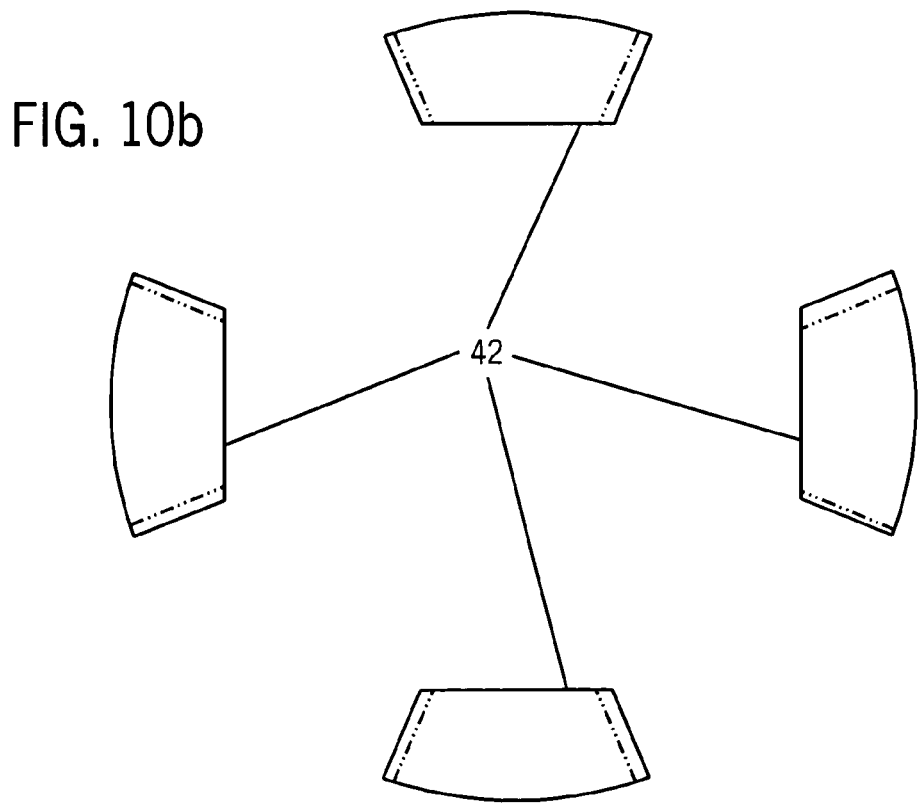

It is also possible to attach or weld two end rings 40 of a soft magnetic material, seen in FIG. 10a, to the ends of the clamping pieces 45a, 45b. The end rings 40 provide smoothing for flux in a circumferential direction around the axis of rotation 33a. The pole pieces 42 are also made of a soft magnetic material, such as steel. For the 8-pole example, four pole pieces 42 are used. They can be attached to the thin steel end rings 40 by rivets, screws, welds, or any feasible means. The thin steel rings 40 hold the pole pieces in place against centrifugal force. Alternatively, end pole pieces 42 can be held by rivets 47 passing through the end pieces 46.

Figure 14:
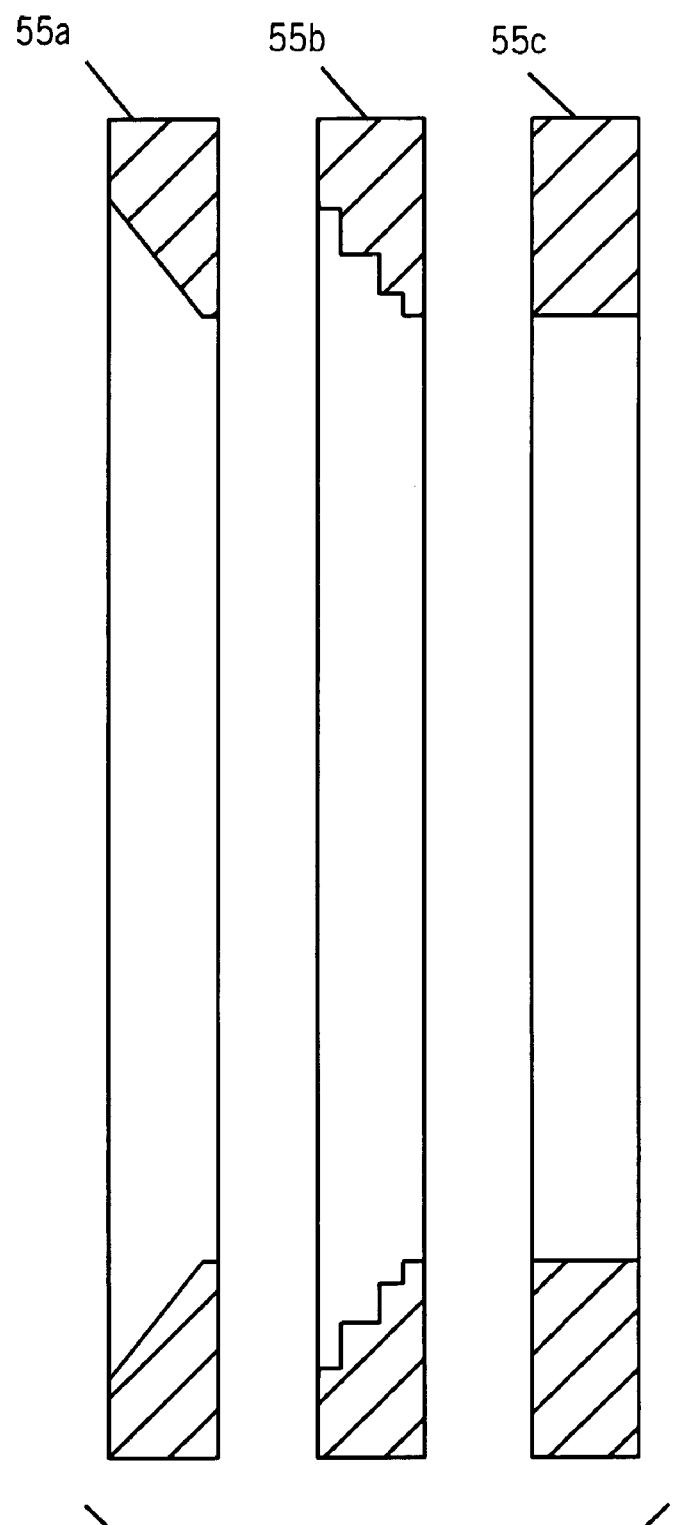
FIG. 14 are side views in elevation of three embodiments of flux collectors used in the machine of FIG. 8.

As seen in FIG. 8, flux collectors 55 are disposed in between the DC excitation assemblies 35, 36 and the rotor 32 of the machine to guide the flux that passes through the axial air gaps 37a, 37b. As seen in FIG. 14, these flux collectors 55a, 55b, 55c or flux guides can be of constant cross section 55c across the flux path, or of tapered cross section 55a or stepped 55b as seen in FIG. 14. The examples 55a, 55b, 55c on the left side show that the equalizer is made of wound lamination strip, while the examples on the right side 55d, 55e, 55f are formed of a compressed powder. One face faces the excitation cores 35b, 36b and the opposite face faces the axial air gaps 37a, 37b. A lamination strip is wound in a toroidal shape to form the flux collector. It is also possible to use compressed low-loss soft magnetic powder for the flux collector. These shapes in FIG. 14 affect the leakage flux differently. The flux collector provides for equalization of the peripheral (circumferential) flux and helps to reduce core loss. Once the peripheral flux is equalized, the solid steel of the bearing brackets can be used for conducting the DC flux as shown in FIGS. 15 and 17.

Figure 15:
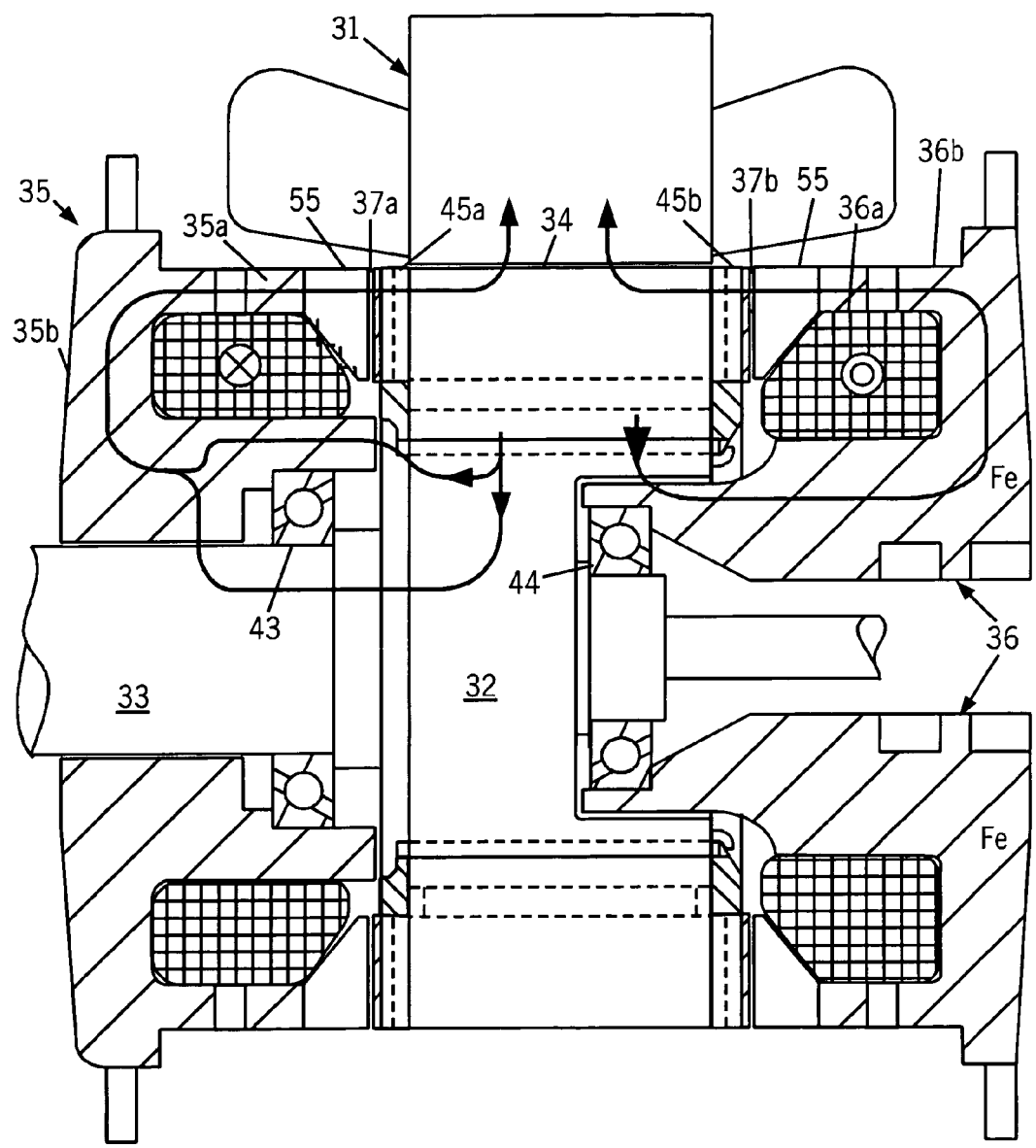
FIGS. 15 and 16 are sectional views illustrating flux paths through the machine of FIG. 8 during field enhancement.
Figure 16:
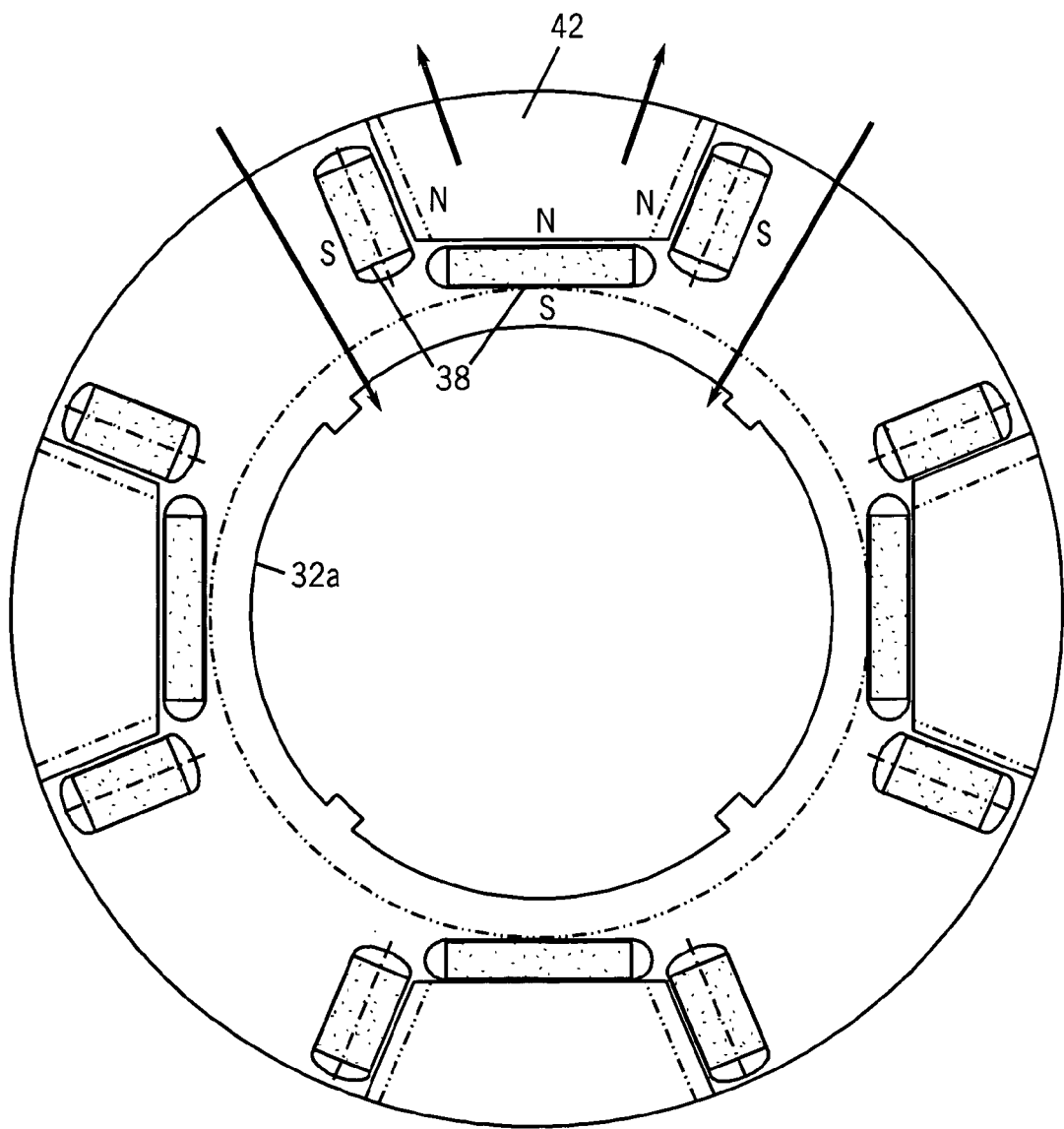
Figure 17:
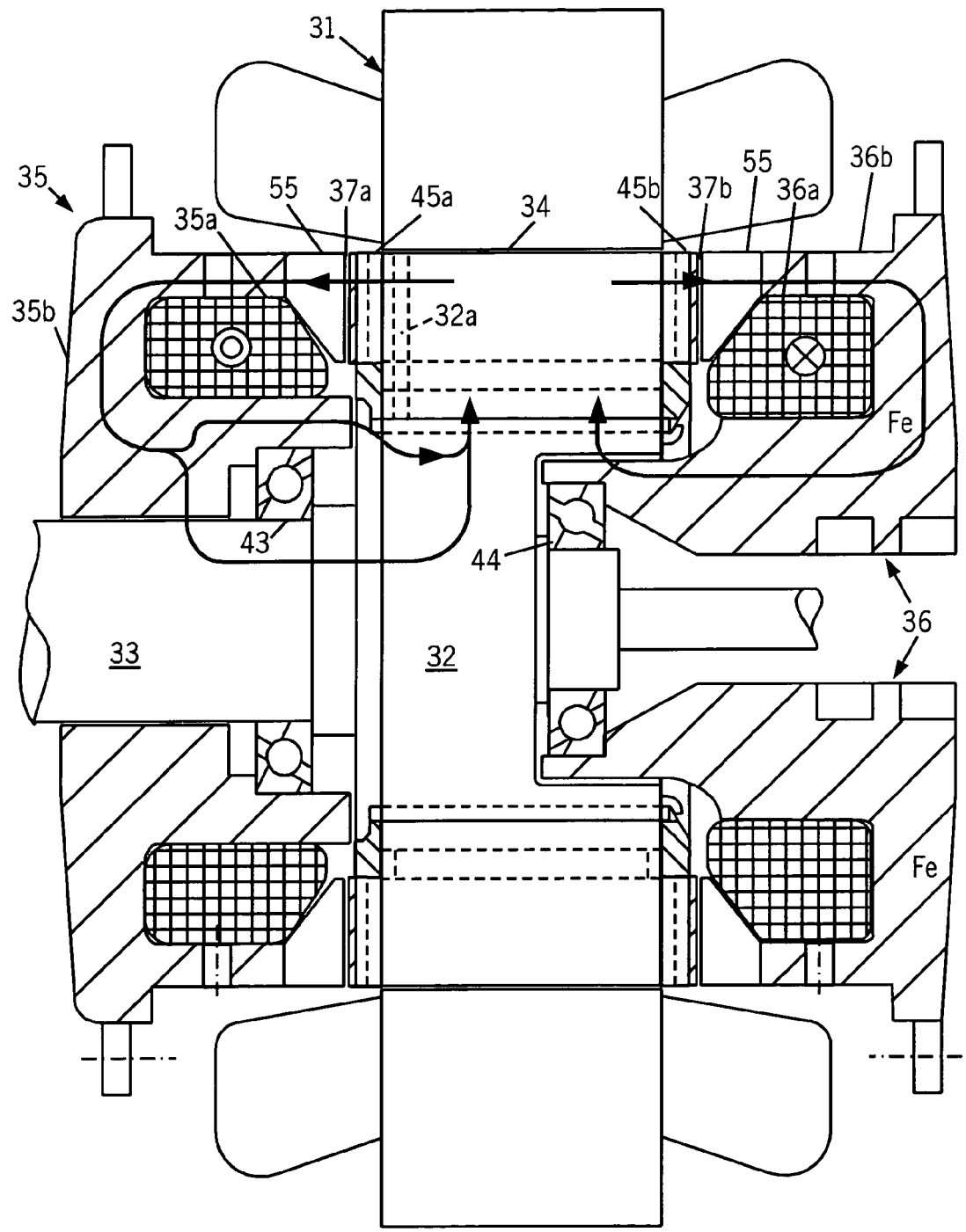
FIGS. 17 and 18 are sectional views illustrating flux paths through the machine of FIG. 8 during field weakening.

Referring to FIGS. 15, 16, 17 and 18, the PM material 38 produces the north and south poles on the side of the exterior of rotor 32 that faces the stator 31 and the radial air gap 34 (FIGS. 15, 17). Subsequently, the radial air gap 34 receives the secondary flux from the rotor 32, which interacts with the primary flux induced by the stator windings 31b to produce a torque. The rotor flux in the radial air gap 34 can be either enhanced or weakened by the DC excitation in the excitation assemblies 35, 36 that face the ends the rotor 32. The polarity of the currents in the excitation coils are the opposite for these two cases. The DC flux produced by the DC excitation currents is directed through the core laminations so as to cross the axial air gaps 37a, 37b in an axial direction.

The magnetic flux paths of a pole pair for field enhancement are shown in FIGS. 15 and 16. During the enhancement of air gap flux (previously described in relation to FIG. 7b) the PM material 38 in the rotor 32 tends to prevent the diffusion of flux between the rotor poles (FIG. 16) More flux is guided to the radial air gap 34 (FIG. 15) to interact with the stator-induced flux.

Figure 18:
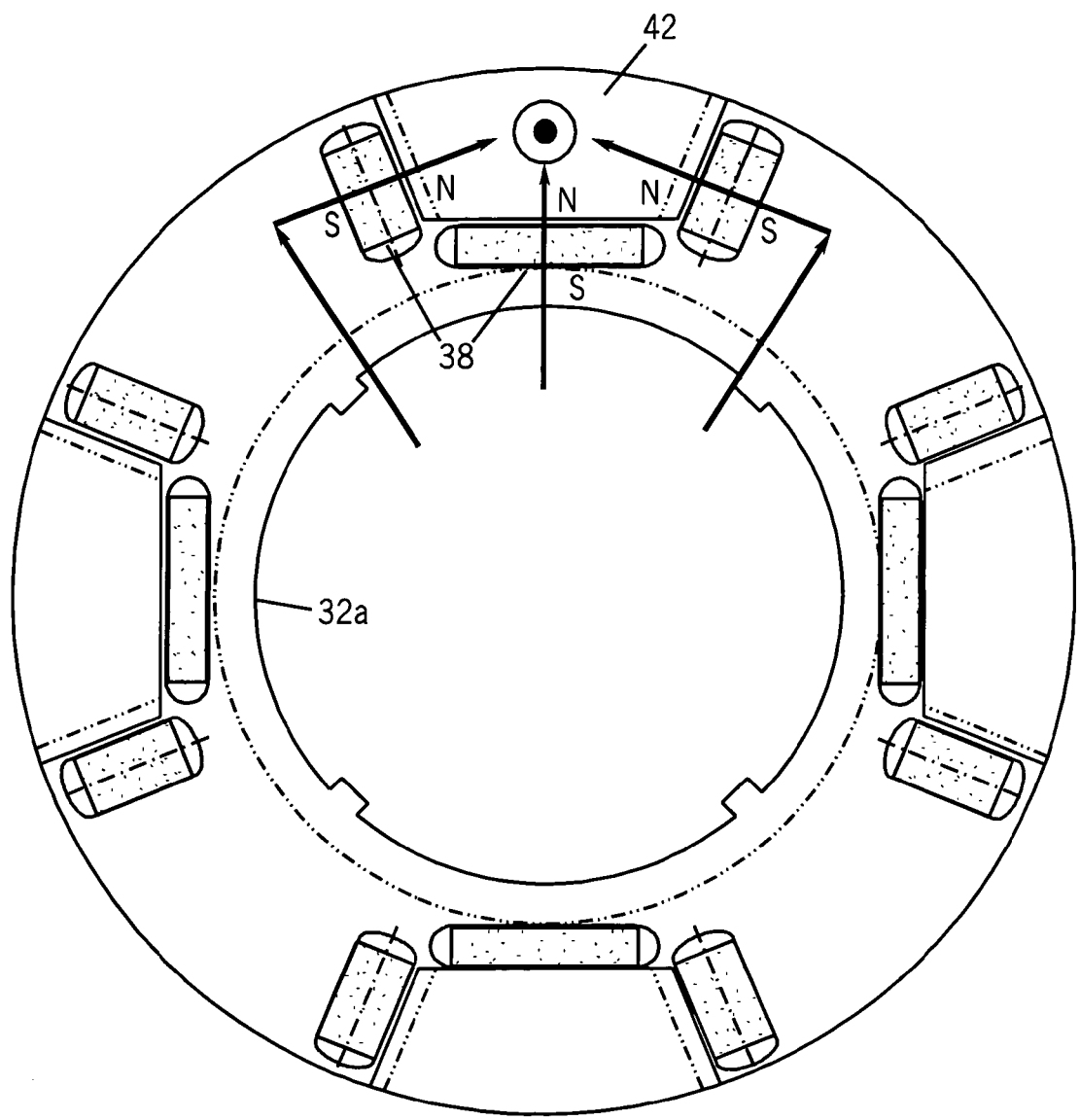

The magnetic flux paths of a pole pair for field weakening are shown in FIGS. 17 and 18. During field weakening operation (previously described in relation to FIG. 7c) a great portion of the main air gap flux is drawn away from the air gap 34 (FIG. 17) by controlling the DC current in the DC excitation windings 35a, 36a. The back emf in the stator winding when the rotor is at high speed is greatly reduced by a lower flux density in the primary air gap 34 between the stator 31 and the rotor 32.

The invention provides a high strength undiffused brushless machine. The DC flux produced by the excitation coils 35a, 36a flows to or from the north and south poles of the rotor 32 through the air gaps 34, 37a, 37b without the use of brushes. The DC flux in the rotor 32 is guided to the north and south pole portion on the circumference of the rotor 32 to interact with the armature flux in the primary air gap 34. The undiffused arrangement provided by PM elements 38 guides the flux to the main air gap 34 facing the stator 31. Both the PM elements 38 and the excitation coils 35a, 36a enhance the air-gap flux density. Consequently, a high air-gap torque for a given stator current can be obtained. By controlling the direction of the current in the additional stator excitation coils 35a, 36a, the main air-gap flux can be weakened, when desired. This motor requires only a simple power electronics drive of a type known in the art, which lowers the overall cost of a system using this machine.

The invention is applicable to both AC synchronous and DC brushless machines and to both motors and generators.

In the present invention, the laminated rotor core structure reduces harmonic flux losses. The axial air gaps cause the DC flux to be directed through the rotor core laminations in an axial direction. This is different from other types of radial gap machines. The interior PM elements define or enclose only half of the total number of poles. The thickness and sizes of the PM elements can be different, so long as the arrangement is symmetrical. A balanced mechanical distribution is required to avoid the unbalanced centrifugal force. The side poles can be mechanically supported by the non-magnetic clamping pieces or by the rivets clamped through the punched holes in the laminations of the rotor core.

Advantages also result from the rotor constructions in which a thin steel ring is placed at the ends of the side poles for further reducing the flux fluctuation between the side poles and for holding the side poles mechanically. Stationary laminated flux collectors are provided to equalize the flux before flux is conducted into the solid steel flux paths. The rotor magnetic paths for the left and right sides can be different to bring out the best of the embodiment. The field enhancement can raise the radial air-gap flux to a value much higher than that of a PM can produce. This increases the motor torque. Because the torque capability is increased, the machine of the present invention is physically more compact than other types of machines for a given torque. This meets an objective of the technology. The field weakening can reduce the field strength at high speed to lower the back emf produced in the winding. Therefore, under a given DC link voltage the speed range of the machine can be increased. This again meets the compactness objective by simplifying the drive system requirement.

This has been a description of the preferred embodiments of the invention. The present invention is intended to encompass additional embodiments including modifications to the details described above which would nevertheless come within the scope of the following claims.

I claim:

1. A brushless electric machine comprising:
   a stator and a rotor spaced from the stator to define a primary air gap relative to an axis of rotation for the rotor;
   a rotor having an axis of rotation and having pairs of rotor pole portions of opposite polarity disposed at least partly around a circumference of the rotor;
   first and second stationary excitation coil assemblies for receiving direct current from an external source and being positioned across secondary air gaps so as to induce a component of flux in the rotor which increases a resultant flux in the primary air gap when said direct current is of a first polarity and which reduces resultant flux in the primary air gap when said direct current is of a second polarity opposite said first polarity;
   wherein permanent magnet (PM) material is disposed between the rotor pole portions for conveying a second component of flux to or from the primary air gap and for inhibiting the component of flux from leaking from said pole portions prior to reaching the primary air gap when said direct current is of the first polarity; and
   further comprising ring-shaped flux collector members disposed between the first stationary excitation coil assembly and the second stationary excitation coil assembly and respective ends of the rotor to conduct flux in an axial direction relative to the rotor while inhibiting eddy currents.

2. The machine of claim 1, wherein each stationary, excitation coil assembly includes a coil supported by a core that is made of iron, steel or another iron alloy.

3. The machine of claim 1, wherein each stationary, excitation coil assembly includes a coil supported by a core that is made of a compressed powder material having ferromagnetic properties.

4. The machine of claim 1, wherein the flux collector members are each comprised of a laminated coil.

5. The machine of claim 1, wherein the flux collector members are each comprised of a compressed low-loss soft-magnetic powder.

6. The machine of claim 1, wherein the flux collector members each have a cross-section that is tapered from narrow to wide in a direction toward one end of the rotor.

7. The machine of claim 1, wherein the flux collector members each have a cross-section that is stepped from narrow to wide in a direction toward one end of the rotor.

8. The machine of claim 1, wherein said rotor has a body portion that is cylindrical except for longitudinally extending grooves, wherein PM material is disposed in said grooves and wherein elongated pole pieces are disposed in said grooves over the PM material to form a cylindrical rotor with poles of alternating polarity on a rotor circumference that are separated by PM material.

9. The machine of claim 8, wherein end pole pieces are mounted to opposite ends of the rotor and to the ends of the elongated pole pieces.

10. A brushless electric machine comprising:
    a stator and a rotor spaced from the stator to define a primary air gap relative to an axis of rotation for the rotor;
    a rotor having an axis of rotation and having pairs of rotor pole portions of opposite polarity disposed at least partly around a circumference of the rotor;
    at least a first stationary excitation coil assembly for receiving direct current from an external source and being positioned across a secondary air gap so as to induce a component of flux in the rotor which increases a resultant flux in the primary air gap when said direct current is of a first polarity and which reduces resultant flux in the primary air gap when said direct current is of a second polarity opposite said first polarity;
    wherein permanent magnet (PM) material is disposed between the rotor pole portions for conveying the component of flux to or from the primary air gap and for inhibiting the component of flux from leaking from said pole portions prior to reaching the primary air gap when said direct current is of the first polarity;
    wherein said rotor has a body portion that is cylindrical except for longitudinally extending grooves, wherein PM material is disposed in said grooves and wherein elongated pole pieces are disposed in said grooves over the PM material to form a cylindrical rotor with poles of alternating polarity on a rotor circumference that are separated by PM material;
    wherein the rotor is formed by a plurality of laminations which are held on opposite ends by clamping pieces of non-magnetic material; and
    wherein end pole pieces are mounted to opposite ends of the rotor and held against the ends of the elongated pole pieces by the clamping pieces.

11. The machine of claim 10, wherein the rotor includes ring-shaped flux smoothing members positioned at opposite ends between the laminations and the clamping pieces.

12. The machine of claim 10, wherein the machine is brushless AC synchronous machine.

13. The machine of claim 10, wherein the machine is a brushless DC machine.

14. The machine of claim 10, wherein the machine is a motor.

15. The machine of claim 10, wherein the machine is a generator.

* * * * *